United States Patent [19]
Morimoto et al.

[11] Patent Number: 5,739,773
[45] Date of Patent: Apr. 14, 1998

[54] VEHICULAR NAVIGATION APPARATUS ENABLING EASY RECOGNITION OF DISPLAYED TRAFFIC INFORMATION

[75] Inventors: Akihiro Morimoto, Yokohama; Masahiro Saiki, Sagamihara, both of Japan

[73] Assignee: Matsushita Electric Industrial Co., Ltd., Osaka, Japan

[21] Appl. No.: 748,984

[22] Filed: Nov. 14, 1996

[30] Foreign Application Priority Data

Nov. 17, 1995  [JP]  Japan .................................... 7-299444

[51] Int. Cl.$^6$ ............................................ G08G 1/123
[52] U.S. Cl. ...................... 340/990; 340/994; 340/995; 364/449.5
[58] Field of Search .................................. 340/990, 995, 340/994, 988; 364/449.3, 449.5, 449.7

[56] References Cited

U.S. PATENT DOCUMENTS

| | | | |
|---|---|---|---|
| 4,937,570 | 6/1990 | Matsukawa et al. | 340/994 |
| 5,115,398 | 5/1992 | De Jong | 340/995 |
| 5,243,528 | 9/1993 | Lefebvre | 364/449.5 |
| 5,313,200 | 5/1994 | Sone | 340/990 |
| 5,323,321 | 6/1994 | Smith, Jr. | 340/995 |
| 5,369,588 | 11/1994 | Hayami et al. | 340/990 |
| 5,471,205 | 11/1995 | Izawa | 340/990 |

*Primary Examiner*—Jeffery Hofsass
*Assistant Examiner*—John Tweel, Jr.
*Attorney, Agent, or Firm*—Pearne, Gordon, McCoy & Granger LLP

[57] ABSTRACT

Traffic information items, for instance, jam information items, which are distant from the self vehicle position are displayed in a different manner from traffic information items near the self vehicle position. For example, a colored circle or a proper mark is displayed at a distant region containing traffic information items. Alternatively, part of distant traffic information items are not displayed. In a further alternative, the display color of distant traffic information items is made different from that of near traffic information items.

16 Claims, 5 Drawing Sheets

VEHICULAR NAVIGATION APPARATUS ENABLING EASY RECOGNITION OF DISPLAYED TRAFFIC INFORMATION

BACKGROUND OF THE INVENTION

1. Field of the Invention

The present invention relates to a vehicular navigation apparatus having a function of displaying the present position and the running direction of the self vehicle, and other information on a map that is displayed on the screen of a CRT display, a liquid crystal display, or the like.

2. Description of the Related Art

Conventionally, in a navigation apparatus which displays map information on a screen, there is known a technique of judging the importance of each traffic information, and superimposing, on the map information, traffic information that is judged important while not displaying traffic information that is judged low in importance (see Japanese Unexamined Patent Publication No. Hei. 4-40596, for instance). FIG. 8 shows an example of a displayed picture in the above type of conventional vehicular navigation apparatus. In FIG. 8, reference character A denotes the position of the self vehicle and the associated arrow indicates a running direction (upward in this case). Character B denotes a road, and C represents traffic information, specifically jam information. In the case of FIG. 8, traffic information is displayed only in an area defined by dotted line K that forms a given angle with the running direction of the self vehicle, to improve the visibility of displayed traffic information. Jam information D is not displayed because it is out of the area defined by dotted line K.

Further, in a navigation apparatus which displays map information on a screen, there is known a technique of displaying map information utilizing perspective representation to allow the driver to easily recognize a correspondence between the position of his own vehicle on a displayed map and its position on actual roads (see Japanese Examined Patent Publication No. Hei. 6-90041). FIG. 9 shows a perspective representation version of the picture of FIG. 8.

However, in the above conventional technique of displaying map information by perspective representation, traffic information relating to a position near the self vehicle and that relating to a distant position are displayed in the same display form. Therefore, the conventional technique has a problem that information items relating to distant positions are displayed in a complicated manner and are hence difficult to recognize. For example, jam-concentrated regions E and F in FIG. 8 are displayed as regions G and H in FIG. 9 when perspective representation is used. As seen from FIG. 9, it is difficult to recognize distant jam information items because they are concentrated in small regions.

SUMMARY OF THE INVENTION

An object of the invention is therefore to provide a vehicular navigation apparatus which can display road traffic information that is necessary for driving, properly, i.e., in a manner easily recognizable by the driver without lowering the visibility of map information displayed on a screen.

To attain the above object, according to the invention, there is provided a vehicular navigation apparatus comprising traffic information acquiring means for acquiring road traffic information; self vehicle position detecting means for detecting a present position of a self vehicle; traffic information display form changing means for changing a display form of the traffic information in accordance with a distance of the traffic information from the present position of the self vehicle; map information storing means for storing map information; map information display form changing means for changing a display form of the map information in accordance with a distance of the map information from the present position of the self vehicle; and display means for displaying the display-form-changed traffic information and the display-form-changed map information. This configuration provides an advantage that road traffic information that is necessary for driving can be displayed properly, i.e., in a manner easily recognizable by the driver without lowering the visibility of map information displayed on a screen.

According to a first embodiment of the invention, the traffic information display form changing means changes colors of a region containing a traffic information item in accordance with the distance thereof from the present position of the self vehicle.

According to a second embodiment of the invention, the traffic information display form changing means applies a mark to a region containing a traffic information item in accordance with the distance thereof from the present position of the self vehicle.

According to a third embodiment of the invention, the traffic information display form changing means restricts a display amount of the traffic information in accordance with the distance thereof from the present position of the self vehicle.

According to a fourth embodiment of the invention, the traffic information display form changing means changes a display color of the traffic information in accordance with the distance thereof from the present position of the self vehicle.

According to a fifth embodiment of the invention, the map information display form changing means restricts a display amount of the map information in accordance with the distance thereof from the present position of the self vehicle.

Further, the display means may display the display-form-changed map information by perspective representation.

DESCRIPTION OF THE PREFERRED EMBODIMENTS

Embodiment of the present invention will be hereinafter described with reference to the accompanying drawings.

Figure 1:
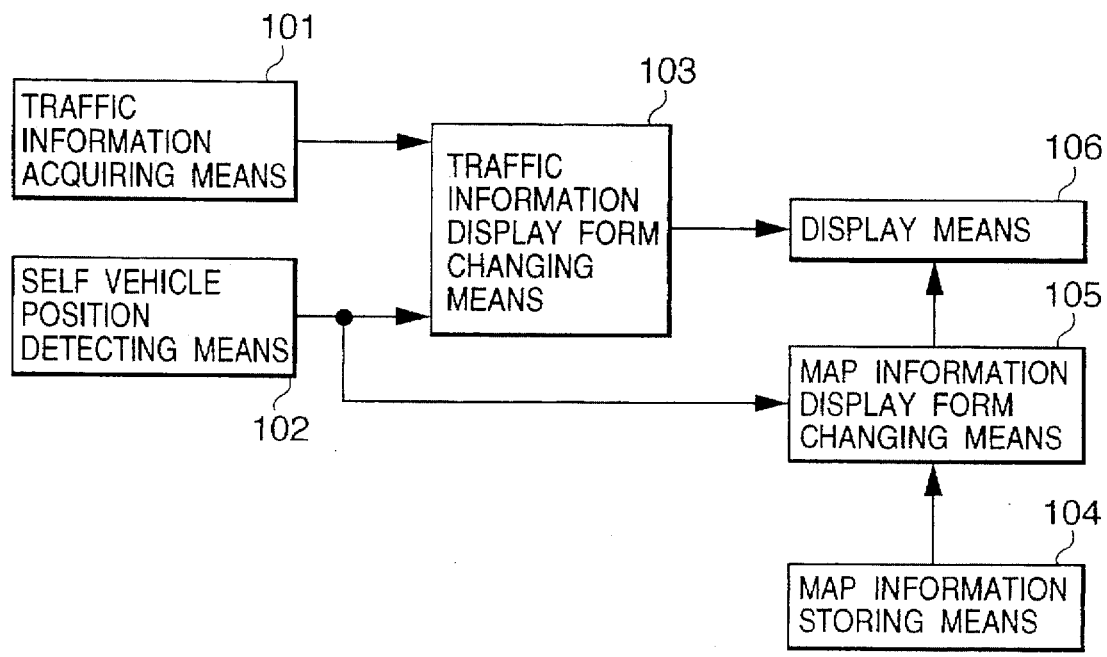
FIG. 1 is a block diagram showing a general configuration of a vehicular navigation apparatus according to an embodiment of the present invention.

FIG. 1 shows the configuration of a vehicular navigation apparatus according to an embodiment of the invention. In FIG. 1, a traffic information acquiring means 101 acquires traffic information. A self vehicle position detecting means 102 detects the present position of the self vehicle. A traffic information display form changing means 103 changes the display form of traffic information based on the traffic information and the self vehicle position. A map information storing means 104 stores map information. A map information display form changing means 105 changes the display form of map information based on the map information and the self vehicle position. A display means 106 displays traffic information received from the traffic information display form changing means 103 and map information received from the map information display form changing means 105.

The operation of the embodiment will be described below. The traffic information acquiring means 101 acquires real-time traffic information from such services as VICS (vehicle information and communication system) or ATIS (advanced traffic information service), both of which are now becoming common services. In VICS, for instance, traffic information is transmitted in the form of FM multiplexed broadcast, or from an optical beacon or a radio beacon. The position detecting means 102 detects the present position of the self vehicle according to the global positioning system (GPS) which is now becoming widespread, an inertial navigation system, or a like system. The traffic information display form changing means 103 changes the display form of traffic information received from the traffic information acquiring means 101 in accordance with its distance from the self vehicle position that is received from the position detecting means 102. The map information storing means 104 stores information of principal roads such that they are classified into various types such as an expressway, an urban motor way, a road with maximum speed restriction to 60 km/h, a city road, a suburban road, and a mountain road. The map information display form changing means 105 changes the display form of map information received from the map information storing means 104 in accordance with its distance from the self vehicle position that is received from the position detecting means 102. The display means 106 displays traffic information received from the traffic information display form changing means 103 and map information received from the map information display form changing means 105.

Figure 8:
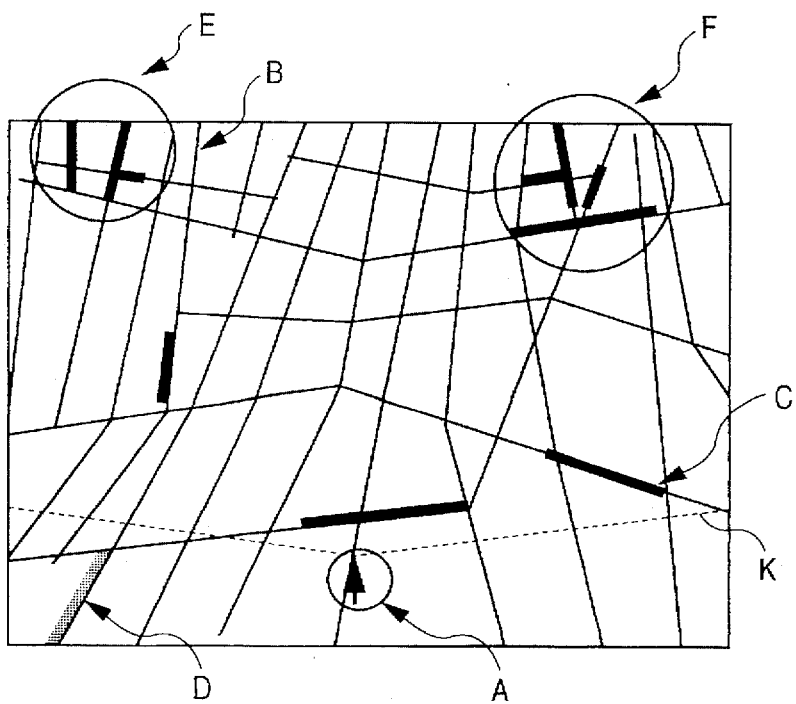
FIG. 8 shows a displayed picture in a conventional vehicular navigation apparatus.

A description will now be made of display contents in the embodiment with assistance of FIGS. 8 and 9, which were used above in describing the conventional apparatuses.

Figure 2:
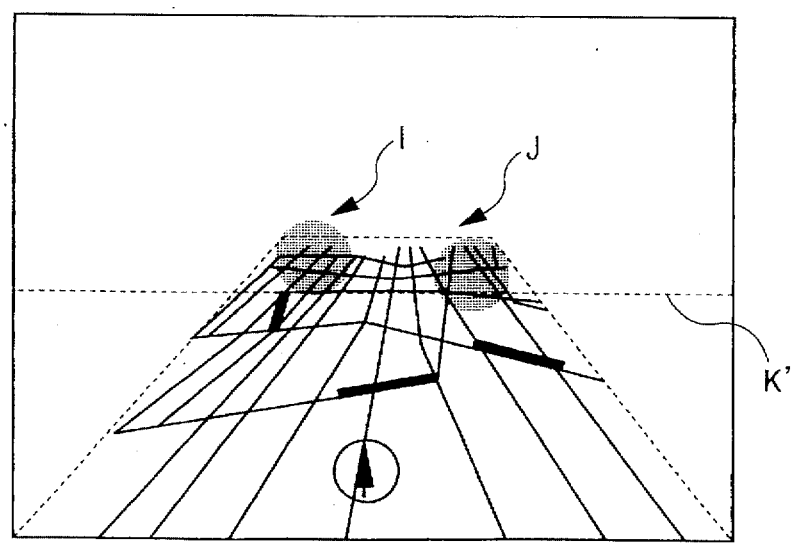
FIGS. 2–7 show displayed pictures in the vehicular navigation apparatus of FIG. 1.

FIG. 2 shows an example picture according to the embodiment in which map information is displayed by perspective representation and, as a result of operation of the traffic information display form changing means 103, regions containing traffic information items are colored in accordance with their distances from the self vehicle position. More specifically, in FIG. 2, instead of displaying jam information as in the case of regions G and H in FIG. 9, jam-information-containing regions I and J which are "distant" in terms of their distances from the self vehicle position are colored. The word "distant" as used above means that a subject region is located on the opposite side (deep side) of dotted line K' with respect to the self vehicle position (see FIG. 2). Each of regions I and J is colored such that a circle which has its center at the mid point of the start and end points of a jam and passes the start and end points is given a color that is different from colors used in the map. Since distant traffic information items are displayed in a simplified manner, traffic information can be recognized at a glance.

In this embodiment the word "distant" in terms of the distance of a subject region from the self vehicle position is defined as a state that the subject region is located on the opposite side (deep side) of dotted line K' with respect to the self vehicle position (see FIG. 2). In this connection, dotted line K' may be set at any position as long as it is more distant from the self vehicle position than a given position is. Alternatively, the word "distant" may be defined as a state that a subject region is outside a circle whose center is located at the self vehicle position. These definitions of the word "distant" also apply to the following embodiments. Further, although in the above embodiment a circle is displayed at the mid point of the start and end points of a jam, it may be displayed at the start or end position. Further, the size of a circle may be changed as desired, and an ellipse or a rectangle may be used instead of a circle.

Figure 3:
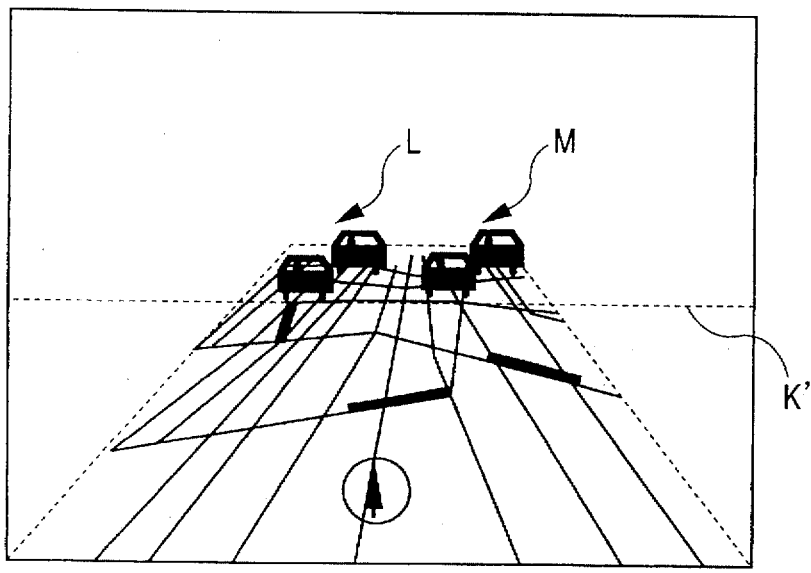

FIG. 3 shows an example picture in which, as a result of operation of the traffic information display form changing means 103, regions containing traffic information items are marked in accordance with their distances from the self vehicle position. More specifically, in FIG. 3, instead of displaying jam information as in the case of regions G and H in FIG. 9, jam-information-containing regions which are "distant" in terms of their distances from the self vehicle position are given jam marks L and M. Since distant traffic information items are displayed in a simplified manner, traffic information can be recognized at a glance. Marks other than the mark of FIG. 3 may be used as long as it allows the driver to understand that it means a jam.

Figure 4:
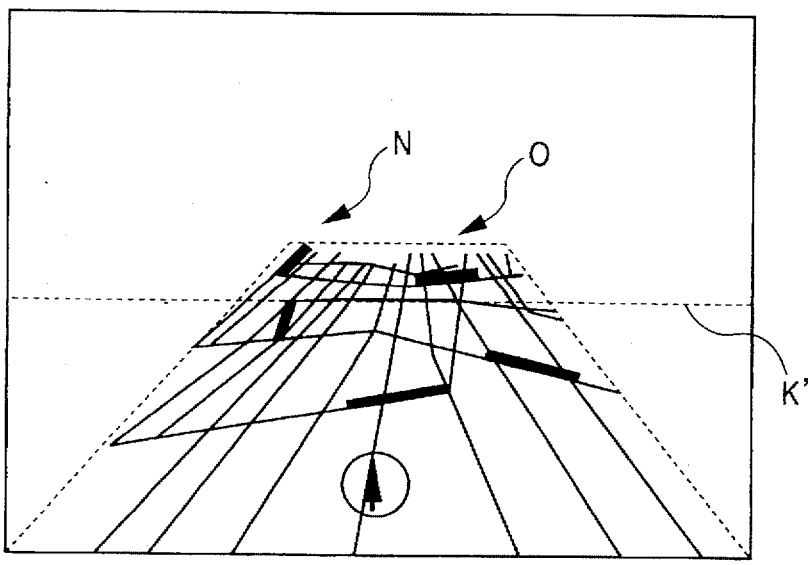

FIG. 4 shows an example picture in which, as a result of operation of the traffic information display form changing means 103, the display amount of traffic information items is restricted in accordance with their distances from the self vehicle position. More specifically, in FIG. 4, instead of displaying all the jam information items as in the case of regions G and H in FIG. 9, among jam-information-containing regions that are "distant" in terms of their distances from the self vehicle position, only long-jam regions N and O are displayed. Since distant traffic information items are displayed in a simplified manner, traffic information can be recognized at a glance.

Figure 5:
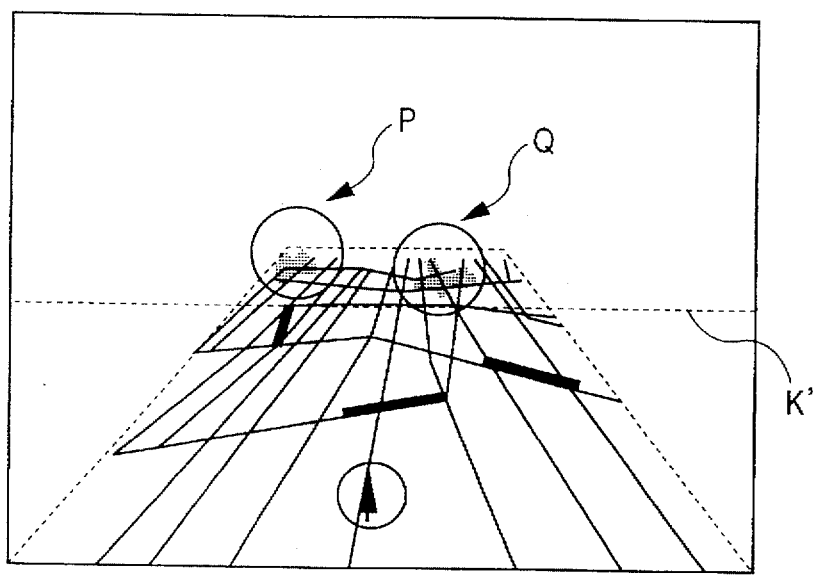

FIG. 5 shows an example picture in which, as a result of operation of the traffic information display form changing means 103, the display color of traffic information items is changed in accordance with their distances from the self vehicle position. More specifically, in FIG. 3, instead of displaying jam information items in the same color as in the case of regions G and H in FIG. 9, the display color of jam information items P and Q which are "distant" in terms of their distances from the self vehicle position are made different from that of other jam information items. Since distant traffic information items are so displayed as to be distinguished from near ones, traffic information can be recognized at a glance.

Figure 6:
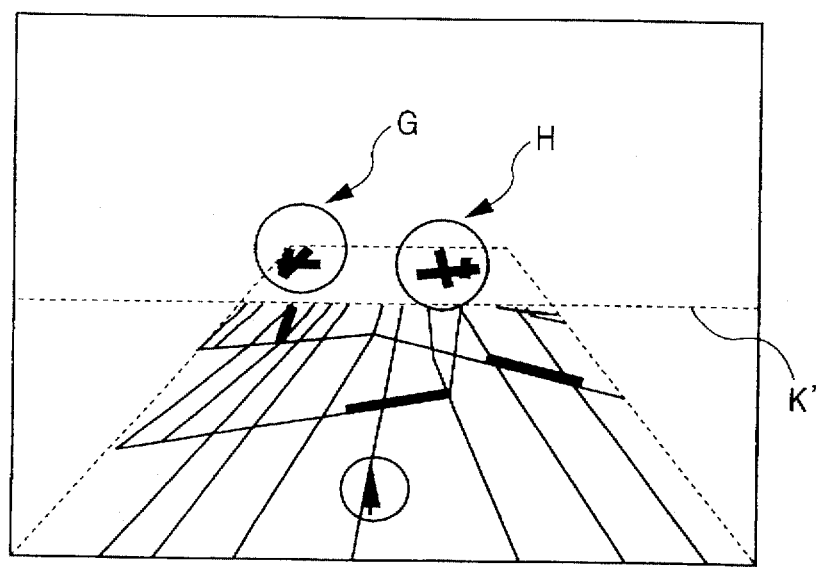

FIG. 6 shows an example picture in which, as a result of operation of the map information display form changing means 105, the display form of map information items is changed in accordance with their distances from the self vehicle position. More specifically, in FIG. 6, map information items that are "distant" in terms of their distances from the self vehicle position are not displayed. Since distant traffic information items are displayed in a simplified manner, traffic information can be recognized at a glance.

Figure 9:
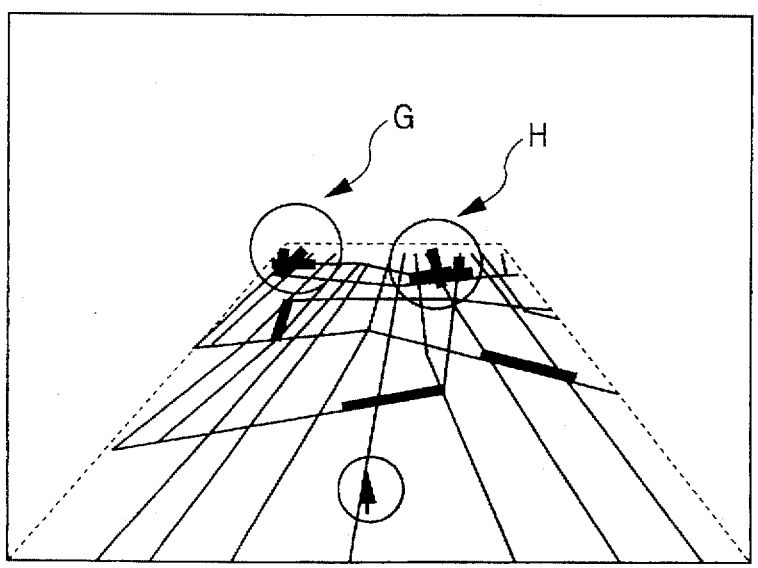
FIG. 9 shows a displayed picture in another conventional vehicular navigation apparatus.

Although the jam information items in regions G and H are displayed in FIG. 6 in the same manner as in FIG. 9, they may be replaced by the colored regions I and J of FIG. 2, the jam marks L and M of FIG. 3, the jam information items N and O of FIG. 4, or the jam information items P and Q of FIG. 5.

Figure 7:
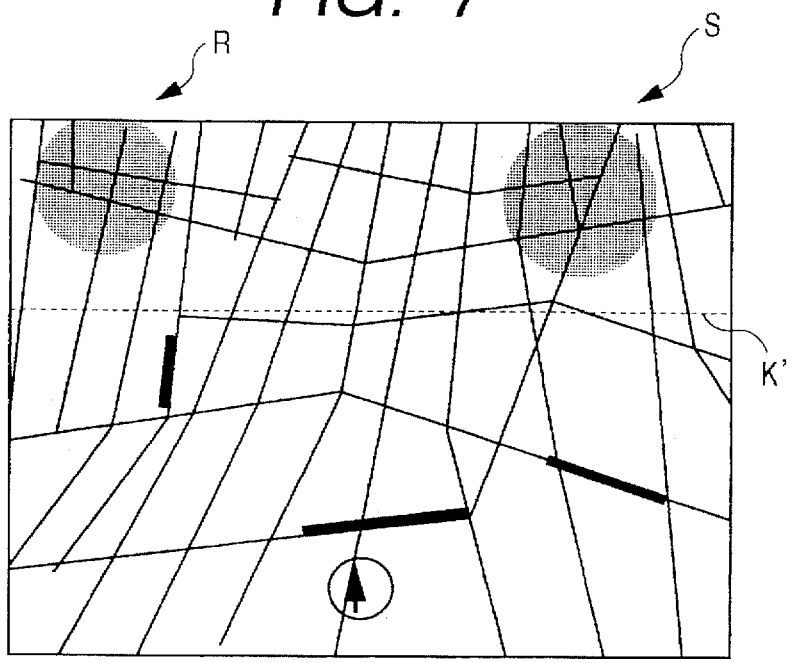

Although the above embodiments are directed to the case of displaying map information by perspective representation, it may be displayed without using perspective representation. For example, traffic-information-containing regions may be colored in accordance with their distances from the self vehicle position, as shown in FIG. 7 as regions R and S. Instead of coloring regions R and S, the traffic information may be displayed in a similar manner to the manner of the embodiment of FIG. 3, 4, or 5, or the traffic information and the map information may be displayed in a similar manner to the manner of the embodiment of FIG. 6.

What is claimed is:

1. A vehicular navigation apparatus comprising:

traffic information acquiring means for acquiring road traffic information;

self vehicle position detecting means for detecting a present position of a self vehicle;

means for changing a display form of the traffic information in accordance with a distance of the traffic information from the present position of the self vehicle such that traffic information is displayed in a first form when said traffic information is a first distance from said present position and is displayed in a second form when said traffic information is a second distance from said present position;

means for storing map information;

means for changing a display form of the map information in accordance with a distance of the map information from the present position of the self vehicle; and display means for displaying the display-form-changed traffic information and the display-form-changed map information.

2. The vehicular navigation apparatus according to claim 1, wherein the traffic information display form changing means changes colors of a region containing a traffic information item in accordance with the distance thereof from the present position of the self vehicle.

3. The vehicular navigation apparatus according to claim 1, wherein the traffic information display form changing means applies a mark to a region containing a traffic information item in accordance with the distance thereof from the present position of the self vehicle.

4. The vehicular navigation apparatus according to claim 1, wherein the traffic information display form changing means restricts a display amount of the traffic information in accordance with the distance thereof from the present position of the self vehicle.

5. The vehicular navigation apparatus according to claim 1, wherein the traffic information display form changing means changes a display color of the traffic information in accordance with the distance thereof from the present position of the self vehicle.

6. The vehicular navigation apparatus according to claim 1, wherein the map information display form changing means restricts a display amount of the map information in accordance with the distance thereof from the present position of the self vehicle.

7. The vehicular navigation apparatus according to claim 2, wherein the map information display form changing means restricts a display amount of the map information in accordance with the distance thereof from the present position of the self vehicle.

8. The vehicular navigation apparatus according to claim 3, wherein the map information display form changing means restricts a display amount of the map information in accordance with the distance thereof from the present position of the self vehicle.

9. The vehicular navigation apparatus according to claim 4, wherein the map information display form changing means restricts a display amount of the map information in accordance with the distance thereof from the present position of the self vehicle.

10. The vehicular navigation apparatus according to claim 5, wherein the map information display form changing means restricts a display amount of the map information in accordance with the distance thereof from the present position of the self vehicle.

11. The vehicular navigation apparatus according to claim 1, wherein the display means displays the display-form-changed map information by perspective representation.

12. The vehicular navigation apparatus according to claim 2, wherein the display means displays the display-form-changed map information by perspective representation.

13. The vehicular navigation apparatus according to claim 3, wherein the display means displays the display-form-changed map information by perspective representation.

14. The vehicular navigation apparatus according to claim 4, wherein the display means displays the display-form-changed map information by perspective representation.

15. The vehicular navigation apparatus according to claim 5, wherein the display means displays the display-form-changed map information by perspective representation.

16. The vehicular navigation apparatus according to claim 1, wherein the traffic information display form changing means changes the display form of a traffic information item outside a given region, said given region including the present position of the self vehicle.

* * * * *